Patented May 4, 1954

2,677,620

UNITED STATES PATENT OFFICE 2,677,620

BITUMINOUS COMPOSITION

Norman E. Lemmon and Robert E. Karll, Hammond, Ind., and Morris Feller, Chicago, Ill., assignors to Standard Oil Company, Chicago, Ill., a corporation of Indiana No Drawing. Application August 9, 1950,
Serial No. 178,552

7 Claims. (Cl. 106—269)

This invention relates to bituminous roadmaking compositions and pertains more specifically to such compositions which contain components whereby the bituminous material is more securely bonded to a filler, termed the aggregate, and the bonded admixture is made more resistant to weathering.

Many aggregates, especially when wet, are difficult to coat with bituminous materials. This is especially true of acidic stone, such as granite or other igneous rocks which are usually hydrophilic; even though the aggregate is dried before coating, the bond will tend to break down in the presence of water during wear.

A primary object of this invention is the provision of an improved bitumen coating composition that will exhibit improved adherence to aggregate of all types both at the time of coating and during wear. The invention has for other objects such other advantages or results as will hereinafter appear in the specification and claims.

The objects of the invention are accomplished by provision of a composition comprising a bitumen, preferably a petroleum asphalt, and a small amount, preferably 0.5% to 5%, of the reaction product of a phosphorous sulfide, with a 200–700 molecular weight olefin or olefin polymer at 200° to 600° F. for 3 to 6 hours. Before addition to the asphalt, the reaction product is hydrolyzed, for example, by steaming at 250° to 350° F. for a period of 3 to 6 hours; hydrolysis at the lower temperatures within the said range of 250° to 350° F. will avoid excessive formation of acid. It is preferred to wash the hydrolyzed product with hot water to remove inorganic phosphoric acid and other water soluble components. The organic acid content of the reaction product retained therein after water washing enhances the improved coating characteristics of the asphalt composition and is preferably maintained between 1% to 10% by weight based on the reaction product and calculated as NaOH. About 1 to 4 parts by weight of this phosphorus and sulfur containing reaction product and asphalt composition is admixed with 100 parts by weight of the aggregate to provide an improved paving material.

The above composition can be employed in combination with other additives which further adapt it for efficient coating of aggregate and long-term wear. The additives act as promoters and effect additional improved results in using the said reaction product. The addition of a small amount, preferably about 0.5% to 5%, by weight based on the bituminous composition, of a fatty amine, that is, an aliphatic primary amine having a chain length of 8 to 22 carbon atoms, for example, n-decylamine, n-dodecylamine (lauryl amine) and n-octadecylamine, further enhances the said desired characteristics. When the aggregate is hydrophobic the composition is improved by addition of a small amount, with respect to the asphalt, and preferably from about 5% to 25%, by weight based on the reaction product, of a high molecular weight fatty acid, having from about 10 to 20 carbon atoms per molecule, for example, oleic or linoleic acid, or crude fatty acids such as are produced by springing caustic extracts of fatty oils.

The bitumen constituting the binder material in the bituminous road-making compositions of this application can include petroleum residues and asphalt, including straight run, cracked and natural, oxidized and unoxidized asphalts, and coal tar pitches.

The phosphorus sulfide-hydrocarbon reaction product can be readily obtained by reacting a phosphorus sulfide with olefin at a temperature of about 200° F. to about 600° F., and preferably from about 250° F. to about 500° F., using from about 1% to about 50%, and preferably from about 5% to about 25%, e. g. about 15% by weight, of the phosphorus sulfide in the reaction. It is preferred to add a small amount of sulfur, for example, about 2%, to the reaction mixture. The added sulfur appears to have a catalytic effect which may be enhanced by adding the sulfur in increments during the reaction period.

It is advantageous to maintain a non-oxidizing atmosphere, such as, for example, an atmosphere of nitrogen above the reaction mixture. Usually it is preferable to use an amount of the phosphorus sulfide that will completely react with the hydrocarbon so that no further purification becomes necessary; however, an excess of phosphorus sulfide can be used and separated from the product by filtration or by dilution with a solvent, such as hexane, filtering and subsequently removing the solvent by suitable means, such as by distillation. The phosphorus sulfide-olefin reaction products contain sulfur and phosphorus. The preparation of this reaction product of a phosphorus sulfide and an olefin or olefin polymer, but not its purification, is described in U. S. 2,316,082, issued April 6, 1943, to C. M. Loane et al. and in U. S. 2,316,087, issued April 6, 1943, to J. W. Gaynor et al.

The hydrocarbon constituent of this reaction is preferably an olefinic hydrocarbon or a polymer thereof resulting from the polymerization of low molecular weight mono-olefinic hydrocarbons or isomono-olefinic hydrocarbons, such as propylene, butylenes, and amylenes or the copolymers obtained by the polymerization of hydrocarbon mixtures containing isomono-olefin and mono-olefins of less than six carbon atoms. The polymers may be obtained by the polymerization of these olefins or mixtures of olefins in the presence of a catalyst, such as sulfuric acid, phosphoric acid, boron fluoride, aluminum chloride or other similar halide catalysts of the Friedel-Crafts type.

The polymers employed are preferably mono-olefin polymers or mixtures of mono-olefin polymers and isomono-olefin polymers having molecular weights ranging from about 200 to 700. Olefins and olefin polymers having a molecular weight of about 200 to 300 are preferred source material in preparing the reaction product as the combination of such reaction product and asphalt show especially improved coating and coat-retention characteristics. Such polymers can be obtained, for example, by polymerization in the liquid phase of a hydrocarbon mixture containing mono-olefins and isomono-olefins such as butylene and isobutylene at a temperature of from about 0° F. to about 100° F. in the presence of a metal halide catalyst of the Friedel-Crafts types such as, for example, boron fluoride, aluminum chloride, and the like. In the preparation of these polymers we may employ, for example, a hydrocarbon mixture containing isobutylene, butylenes and butanes recovered from petroleum gases, especially those gases produced in the cracking of petroleum oils in the manufacture of gasoline.

A suitable polymer for the reaction with phosphorus sulfide is the product obtained by polymerizing in the liquid phase a hydrocarbon mixture containing butylenes and isobutylenes together with butanes and some $C_3$ and $C_5$ hydrocarbons at a temperature between about 0° F. and 30° F. in the presence of aluminum chloride.

Another suitable polymer is that obtained by polymerizing, in the liquid phase, a hydrocarbon mixture comprising substantially $C_3$ hydrocarbons in the presence of an aluminum chloride complex catalyst. The catalyst is preferably prepared by heating aluminum chloride with isooctane, within the range of about 50° F. to about 110° F. The molecular weight of the propylene polymer prepared under these conditions is about 500 to about 700.

Other suitable polymers can be obtained by polymerizing a hydrocarbon mixture in the presence of boron fluoride, and by fractionating the intermediate obtained in the synthesis of isooctane by polymerizing butylenes in the presence of phosphoric acid. High molecular weight olefins such as cetene ($C_{16}$), cerotene ($C_{26}$), and melene ($C_{30}$) can also be used as the reactant with phosphorus sulfide.

The following specific examples serve to illustrate rather than limit the application and show the effect of the additive herein disclosed in asphalt when coating both sand (hydrophilic) and limestone (hydrophobic).

EXAMPLE 1

An isobutylene polymer having a Saybolt Universal viscosity at 100° F. of about 100 seconds and a molecular weight of about 300 was treated with phosphorus pentasulfide and elemental sulfur at a temperature of 300° F. for 4 hours. The phosphorus pentasulfide in the amount of 15% by weight of the polymer was added and 2%, by weight, of sulfur was subsequently added in four increments over a reaction period of 4 hours. At the end of the reaction period the product was hydrolyzed by steaming the same at about 300° F. for an additional 4 hours. Free phosphoric acid was thereafter removed from the reaction product by washing the product with warm water. An analysis of the product was as follows:

| | Per cent |
|---|---|
| Phosphorus | 2.90 |
| Sulfur | 3.92 |
| Organic acidity (calc. as per cent NaOH) | 3.68 |

The so-formed additive was added in two proportions by weight, 1% and 3% to a road asphalt and a determination of the coating rating and resistance to stripping of the combination was made. To 50 parts by weight of a road aggregate were added 10 parts by weight of water, and to the wetted aggregate were added 2 parts by weight of the asphalt combination. The asphalt and aggregate were mixed for about one minute after which the degree of coating was observed. An additional 50 parts by weight of water were added to the mixture which was again mixed and then allowed to remain at rest for 10 minutes. The mixture was then observed for evidence of stripping of the asphalt from the wet aggregate.

The asphalt combination was employed to coat aggregate of both acid and basic character. Asphalt containing 1% by weight of the said phosphorus- and sulfur-containing reaction product of a polybutylene and phosphorus pentasulfide provided a good coating on sand and exhibited a good resistance to stripping. Asphalt containing 3% of the said reaction product provided a fair coating on limestone and a fair resistance to stripping.

EXAMPLE 2

An olefin polymer having an average molecular weight of approximately 250 was reacted with phosphorus pentasulfide and sulfur in the manner described in Example 1. The reaction product was washed with warm water to remove phosphoric acid. This asphalt-soluble reaction product was added to asphalt in the proportion by weight of 1% and 3% of reaction product based on the weight of the asphalt. To 50 parts by weight of a road aggregate 10 parts of water were first admixed and thereafter 2 parts by weight of the asphalt combination were added thereto. The mixture was stirred for about one minute and the degree of coating was noted. Again 50 parts by weight of water was added to the asphalt-aggregate mixture and, after stirring, was allowed to stand for about 10 minutes after which resistance to stripping was noted. The asphalt combination containing 1% by weight thereof of the phosphorus- and sulfur-containing olefin reaction product was used to coat sand, and a very good coating and moderate stripping rating was obtained. An asphalt combination containing 3% by weight of the reaction product was used to coat limestone aggregate. A fair coating was obtained and stripping was moderate.

The said asphalt combination containing the reaction product of the said olefin polymer of approximately 250 molecular weight and $P_2S_5$ was compared, (the additive being in various concentrations in the asphalt) with a known commercially available asphalt additive in effectiveness both on wet sand and wet limestone, with the following results:

*Table I*

| Kind of Additive | Percent Additive | Kind of Aggregate | Coating | Stripping |
|---|---|---|---|---|
| The Olefin-$P_2S_5$ Reaction Prod. of Example 2. | 1 | Sand | Very good | Moderate. |
| Commercial | 1 | do | Good | Moderate to Extensive. |
| The Olefin-$P_2S_5$ Reaction Prod. of Example 2. | 2 | do | Very good to to excellent. | Small to moderate. |
| Commercial | 2 | do | Good to very good. | Moderate. |
| The Olefin-$P_2S_5$ Reaction Prod. of Example 2. | 3 | Limestone | Fair | Do. |
| Commercial | 3 | do | Poor to Fair | Extensive to complete. |

EXAMPLE 3

An isobutylene polymer having a Saybolt Universal viscosity at 100° F. of 49.9 seconds, an average molecular weight of 250, and a boiling range of 172° F. to 696° F. was treated with 15% by weight of phosphorus pentasulfide and 2% by weight of sulfur at about 300° F. for 4 hours. At the end of this period the reaction product was steamed for an additional 4 hours at 300° F. The inorganic phosphoric acid formed during the steaming process was substantially entirely removed by hot-water washing. This washing procedure consisted essentially of the addition of 10% to 15% by weight of water to the steamed $P_2S_5$ reaction product and steaming for one-half hour with low pressure steam. The aqueous phase, containing substantially all of the water and phosphoric acid, separated immediately. The $P_2S_5$ reaction product was blown bright at 250° F. in a stream of nitrogen. The phosphorus-sulfide hydrocarbon-reaction product was obtained in 90% yield and exhibited an analysis as follows:

| Element | Percentage |
|---|---|
| Phosphorous | 2.79 |
| Sulfur | 4.90 |
| Acidity, organic (calc. as NaOH) | 4.5 |

To the said reaction product was admixed n-dodecylamine in relative quantities of 0.5%, 1.0% and 2.0% by weight based on the reaction product. This composition was in turn added in varying percentages by weight to asphalt. The coating and stripping-resistant characteristics of these were tested with wet aggregate treated asphalts. Aggregate was wetted as in the previous examples and 4 parts by weight of the asphalt, to which the additive had been added, were mixed for 1 minute with 100 parts by weight of the aggregate. After the extent of coating was observed, an equal volume of water was added, and the degree of stripping was evaluated, with the results shown in the following table:

*Table II*

ASPHALT ADDITIVES ON WET SAND

| Additive | Percent Additive in the Asphalt | Coating | Stripping |
|---|---|---|---|
| Olefin - $P_2S_5$ Reaction Prod. of Example 3. | 1 | Very good | Moderate. |
| Do | 2 | Very good to excellent. | Small - Moderate. |
| Said Reaction Prod. +2% n-dodecylamine. | 4 | Excellent | None. |
| Said Reaction Prod. +1% n-dodecylamine. | 2 | do | None. |
| Said Reaction Prod. +0.5 n-dodecylamine. | 1 | do | Slight. |

ASPHALT ADDITIVES ON WET LIMESTONE

| Additive | Percent Additive in the Asphalt | Coating | Stripping |
|---|---|---|---|
| Olefin Polymer-$P_2S_5$ Reaction Prod. of Example 3. | 2 | Poor | Extensive. |
| Do | 3 | Fair | Moderate. |
| Said Reaction Prod. +2% n-dodecylamine. | 4 | Excellent | None. |
| Said Reaction Prod. +1% n-dodecylamine. | 2 | do | Do. |
| Said Reaction Prod. +0.5 n-dodecylamine. | 1 | Good | Slight. |

Although, as previously demonstrated, the phosphorus and sulfur containing reaction product markedly improves the coating and wear characteristics of asphalt when applied to both sand and limestone it is noted that the promotion of the reaction product with a fatty amine, here n-dodecylamine, considerably improves the characteristics of the asphalt, particularly with respect to wet limestone.

EXAMPLE 4

The olefin polymer-$P_2S_5$ reaction product can be improved with respect to its effect on the characteristics of asphalt in coating certain wet limestone aggegrates that are difficult to coat by the addition of a fatty acid to the said reaction product. The reaction product was prepared and purified in the manner described in Example 3. The phosphorus sulfide hydrocarbon reaction product was obtained in 86% yield and had the following analysis:

| Element | Percentage |
|---|---|
| Phosphorus | 5.17 |
| Sulfur | 5.5 |
| Acidity, organic (calc. as percent NaOH) | 7.86 |

In the following tests 4 parts by weight of asphalt plus the composition consisting of the said olefin polymer-$P_2S_5$ reaction product and a fatty acid or mixture of fatty acids were mixed with 100 parts of wet aggregate. The mixture was stirred for one minute and the extent of coating was observed. An equal volume of water then was added, the mixture was stirred, and the resistance of the asphalt to stripping was evaluated.

Table III
TREATED ASPHALT ON WET SAND

| Additive Composition | | Conc. in Asphalt | Coating | Stripping |
|---|---|---|---|---|
| Percent Olefin Reaction Prod. of Example 4 | Percent fatty acid | | | |
| 100 | 0 | 2.0 | Very good | Slight. |
| 100 | 0 | 1.5 | Good | Do. |
| 90 | *10 | 2.0 | Very good | Do. |

TREATED ASPHALT ON WET LIMESTONE

| | | | | |
|---|---|---|---|---|
| 100 | 0 | 2.0 | Good | Slight Moderate. |
| 100 | 0 | 1.5 | Fair | Do. |
| 93.3 | 6.7 oleic | 1.5 | Good | Slight. |
| 90.0 | 10.0 oleic | 1.0 | do | Do. |
| 95.0 | *5.0 | 2.0 | Very good | Do. |
| 90.0 | *10.0 | 2.0 | Excellent | Do. |

*Fatty acid material here was that obtained by caustic extraction of soybean oil and freed from the caustic extract.

It is noted that the addition of the fatty acid, either the soy-bean extract or the oleic acid, greatly improved the resistance to stripping of the asphalt from wet limestone but had little perceptible effect on the bonding characteristics relative to asphalt and sand.

The term "olefin" as used in the phrase "olefin-phosphorus and sulfur containing reaction product" as applied herein and in the appended claims includes olefins, olefin polymers and olefin copolymers.

The asphalt employed in the preceding specific examples was a cut back from a Mid Continent crude and having a flash point not less than 150° F. and a furol viscosity at 140° F. of 120 to 200 seconds.

In addition to the hereinbefore set forth improved results provided by the described phosphorus- and sulfur-containing reaction product of an olefin or olefin polymer and a phosphorus sulfide and selected promoter, it is noted that the reaction product is readily and entirely soluble in asphalt and also possesses the advantage that it can be used in undiluted form.

Having described the invention, we claim the following:

1. A composition of matter comprising a bitumen and a small amount of the phosphorus- and sulfur-containing unneutralized reaction product of a phosphorus sulfide and an olefin hydrocarbon having a molecular weight between about 200 and 700, said reaction product being obtained by reacting from about 1% to about 50% of a phosphorus sulfide with said olefin at a temperature of from about 200° F. to about 600° F., hydrolyzing the reaction product and removing from said hydrolyzed reaction product inorganic acids of phosphorus produced in said hydrolysis.

2. A composition of matter as described in claim 1 in which the olefin hydrocarbon is an olefin polymer having a molecular weight between about 200 and 700.

3. A composition of matter as described in claim 1 in which said phosphorus- and sulfur-containing reaction product is used in amounts of from 0.5% to 5% by weight, based on said bitumen.

4. A composition of matter comprising a major proportion of a bitumen, from about 0.5% to about 5% by weight, based on said bitumen, of the phosphorus- and sulfur-containing unneutralized reaction product of a phosphorus sulfide and an olefin hydrocarbon having a molecular weight between about 200 and 700, and from about 0.5% to 5% by weight, based on said composition, of an alkyl amine having a chain length of 8 to 22 carbon atoms, said reaction product being obtained by reacting about 1% to about 50% of a phosphorus sulfide with said olefin at a temperature of from about 200° F. to about 600° F., hydrolyzing said reaction product and removing from said reaction product inorganic acids of phosphorus produced in said hydrolysis.

5. A composition of matter comprising a major proportion of a bitumen, from about 0.5% to about 5% by weight, based on said bitumen, of the phosphorus- and sulfur-containing unneutralized reaction product of a phosphorus sulfide and an olefin hydrocarbon having a molecular weight between about 200 and 700, said reaction product being obtained by reacting about 1% to about 50% of a phosphorus sulfide with said olefin at a temperature of from about 200° F. to about 600° F., hydrolyzing said reaction product and removing from said hydrolyzed reaction product inorganic acids of phosphorus produced in said hydrolysis, and admixed therewith from about 5% to 25%, by weight, based on said reaction product, of a high molecular weight fatty acid having from about 10 to about 20 carbon atoms per molecule.

6. A composition as described in claim 5 in which the fatty acid is oleic acid.

7. A composition as described in claim 5 in which the fatty acid is linoleic acid.

References Cited in the file of this patent
UNITED STATES PATENTS

| Number | Name | Date |
|---|---|---|
| 2,315,529 | Kelso | Apr. 6, 1943 |
| 2,340,640 | Burk | Feb. 1, 1944 |
| 2,507,731 | Mixon | May 16, 1950 |